US006248189B1

(12) United States Patent
Shaffer et al.

(10) Patent No.: US 6,248,189 B1
(45) Date of Patent: Jun. 19, 2001

(54) ALUMINUM ALLOY USEFUL FOR DRIVESHAFT ASSEMBLIES AND METHOD OF MANUFACTURING EXTRUDED TUBE OF SUCH ALLOY

(75) Inventors: Thomas J. Shaffer, Chesterfield; Joseph E. Diggs, Petersburg, both of VA (US)

(73) Assignee: Kaiser Aluminum & Chemical Corporation, Houston, TX (US)

( * ) Notice: Subject to any disclaimer, the term of this patent is extended or adjusted under 35 U.S.C. 154(b) by 0 days.

(21) Appl. No.: 09/325,432

(22) Filed: Jun. 4, 1999

Related U.S. Application Data

(60) Provisional application No. 60/111,618, filed on Dec. 9, 1998.

(51) Int. Cl.[7] .................................................. C22C 21/08
(52) U.S. Cl. ............................ 148/417; 420/546; 420/534
(58) Field of Search ..................................... 420/544, 546, 420/535, 534; 148/690, 417

(56) References Cited

U.S. PATENT DOCUMENTS 4,525,326 * 6/1985 Schwellinger et al. .............. 420/535

FOREIGN PATENT DOCUMENTS

960610 * 6/1964 (GB) .

OTHER PUBLICATIONS

ASM Handbook: vol. 4 Heat Treating, p. 846, 1994.*

* cited by examiner

*Primary Examiner*—George Wyszomierski
*Assistant Examiner*—Janelle Combs-Morillo
(74) *Attorney, Agent, or Firm*—Jones, Tullar & Cooper PC

(57) ABSTRACT

An aluminum-based alloy useful for driveshaft assemblies and method of manufacturing an extruded tube of such alloy. The alloy includes, in weight %, 0.50 to 0.70% Si, up to 0.30% Fe, 0.20 to 0.40% Cu, up to 0.03% Mn, 0.80 to 1.10% Mg, up to 0.03% Cr, balance Al and impurities. In producing extruded tubing, the alloy is extruded, the extruded billet is water quenched, the quenched tube is drawn in a two-stage drawing operation and the drawn tube is given a precipitation hardening treatment.

12 Claims, No Drawings

ALUMINUM ALLOY USEFUL FOR DRIVESHAFT ASSEMBLIES AND METHOD OF MANUFACTURING EXTRUDED TUBE OF SUCH ALLOY

This application claims the benefit of U.S. Provisional Application No. 60/111,618, filed Dec. 9, 1998.

FIELD OF THE INVENTION

The invention relates to an aluminum alloy and a method of manufacturing an extruded tube useful as part of a driveshaft assembly of a motor vehicle.

BACKGROUND OF THE INVENTION

Light weight driveshafts and alloys therefor are disclosed in U.S. Pat. Nos. 4,392,839; 4,527,978; 5,320,580; 5,607,524; and 5,637,042. Such driveshafts can be made by various techniques such as machining a solid billet, extruding a solid or hollow billet, seam welding, etc. According to the '524 patent, alloy 6061 has been used for driveshaft applications, the alloy including 0.8–1.2% Mg, 0.4–0.8% Si, 0.15–0.4% Cu, 0.04–0.35% Cr, the balance being Al and incidental impurities. Depending on the type of vehicle, aluminum driveshafts can range from 2 or 3 inches in outside diameter to 4 to 5 inches or even higher, e.g. 6 to 7 inches or higher. Typical wall thicknesses can be 0.05 or 0.06 inch up to about 0.08 or 0.09 inch or even thicker. An example of a driveshaft for an automobile could have an outside diameter of about 3.5 inches and a wall thickness of about 0.08 inch whereas a driveshaft for a truck could have an outside diameter of 4.5 to 5 inches and a wall thickness of 0.07 to 0.09 inch. In order to transmit power, each end of the driveshaft typically includes a yoke welded thereto. The yokes cooperate with universal joints to transmit power from a rotating member to a member to be rotated such as a wheel.

Aluminum-magnesium-silicon extrusion alloys are disclosed in U.S. Pat. Nos. 4,113,472; 4,231,817; 4,256,488; 5,223,050 and 5,240,519. Of these, the '472 patent discloses an alloy including 0.9–1.5% Mg, 0.4–0.8% Si, and 0.9–1.5% Cu. The '817 patent discloses an alloy including 0.45–0.98% Mg, 0.3–0.8% Si and 0.5–0.25% Zn, the alloy optionally including 0.04–0.30% Cu, 0.04–0.25% Zr, 0.04–0.30% Cr and 0.04–0.25% Mn and possibly 0.01–0.20% Ti and/or 0.01–0.06% B. The '488 patent discloses an alloy including 0.030–0.60% Mg, 0.45–0.70% Si and 0.10–0.30% Cu with optional inclusions of up to 0.35% Fe, up to 0.15% Zn and up to 0.010% Ti. The '050 patent discloses 6000 series alloys including 6082, 6351, 6061 and 6063 wherein Mg is present as Mg$_2$Si β'-phase particles. The '519 patent discloses an alloy having 1.0–1.5% Si, 0.4–0.9% Cu, 0.2–0.6% Mn, 0.8–1.5% Mg, 0.3–0.9% Cr, 0.03–0.05% Ti, 0.0001–0.01% B, balance Al and impurities.

Commercial automotive drawn 6061 tubing for driveshaft assemblies having yokes welded thereto is produced in T8 and T6 tempers. The T6 temper is produced using a furnace solution heat treatment after cold drawing to finish dimensions. Such solution heat treatments are conducted close to the melting point of the aluminum alloy and thus necessitate use of sophisticated equipment and process control, making the T6 process relatively expensive to carry out. The T8 temper is produced by solutionizing as part of the extrusion process, followed by drawing to finish dimensions. However, when the 6061 alloy is extruded into seamless tubing, grain size variation may occur from surface to center of the tube wall and there may be grain size variation along the length of the tube. Such variation can cause wrinkling during end reduction (a process used to adapt the tube ends to their associated yokes) and excessive total indicated runout ("TIR") on reduced end tubes.

There is a need in the art for an economical process which produces light weight extruded aluminum tubes which can be used in driveshaft assemblies. It would be desirable for the aluminum alloy to exhibit a uniform fine grained structure which allows such extruded tube to be drawn without the need for an expensive separate furnace heat treatment. It would also be desirable if the alloy composition would allow the load requirements for extrusion to be reduced and thus increase the extrusion press productivity. Moreover, it would be desirable if such objectives could be met while also providing increased strength in the heat affected zone adjacent to the weld in the driveshaft assemblies while maintaining sufficient mechanical strength and torsional fatigue resistance.

SUMMARY OF THE INVENTION

In accordance with a preferred embodiment of the invention, an aluminum alloy containing 0.50 to 0.70% Si, up to 0.30% Fe, 0.20 to 0.40% Cu, up to 0.03% Mn, 0.80 to 1.10% Mg, up to 0.03% Cr, balance Al and impurities, can be used in an economical process to make a tube of a driveshaft assembly. A more preferred Si content is 0.55 to 0.65 % and a more preferred Mg content is 0.85 to 1.0%. The alloy may also include up to 0.20% Zn, preferably up to 0.05% Zn and/or up to 0.05% Ti. In order to obtain improved mechanical properties and elongation, the alloy preferably does not include any intentionally added elements which retard recrystallization during solid phase transformations. An especially preferred alloy consists essentially of at least 96% Al, 0.55 to 0.65% Si, up to 0.30% Fe, 0.20 to 0.30% Cu, up to 0.03% Mn, 0.85 to 1.0% Mg, up to 0.03% Cr, up to 0.05% Zn, up to 0.03% Ti.

In the case where the alloy comprises a tube of a driveshaft assembly, the tube can include a yoke welded to each end thereof. The tube preferably comprises a drawn and precipitation hardened extruded tube. The alloy can be processed in a T8 temper having a yield strength of at least 40 ksi, an ultimate tensile strength of at least 45 ksi, and an elongation of at least 5%. By appropriate choice of alloying constituents and/or processing, the alloy can be provided in a T8 temper having a yield strength of at least 45 ksi, an ultimate tensile strength of at least 50 ksi and an elongation of at least 10%.

The invention also provides a process of manufacturing an extruded tube of the aluminum-based alloy described above, the process comprising steps of extruding a billet of the alloy into an extruded tube, quenching the extruded tube from a solutionizing temperature to a temperature below about 200° F., and forming a drawn tube by drawing the extruded tube so as to reduce an outside diameter and wall thickness thereof. The extruded tube can be formed by any suitable technique such as piercing a solid billet of the alloy. The process can further include subjecting the drawn tube to a precipitation hardening heat treatment. The quenching step can be carried out by water cooling the extruded tube at a location adjacent an exit of an extruder used to extrude the tube. The drawn tube can be straightened by any suitable technique such as roller straightening. The drawn tube is preferably subjected to an aging treatment so as to impart a T8 temper to the drawn tube.

In the case where the extrusion is carried out such that the temperature of the extruded tube as it exits the extruder is around 950 to 1050° F., the water spraying preferably reduces the temperature of the tube to below about 150° F. In order to increase mechanical properties and elongation, the extruded tube is preferably subjected to natural aging for a suitable period of time such as one or more days (e.g., at least 4 days) subsequent to the extruding step and prior to the drawing step. The drawing step can be carried out in one or more passes to achieve a total reduction in area of 30 to 70%. For example, the extruded tube can be subjected to first and second drawing operations, each of which achieves a reduction in area of 15 to 35%. The quenching can be carried out by any suitable manner such as by spraying water circumferentially around the extruded tube. In the case where the extrusion is carried out such that the temperature of the extruded tube as it exits the extruder is around 950 to 1050° F., the water spraying preferably reduces the temperature of the tube to below about 150° F. In order to make driveshaft assemblies, the drawn tube can be sectioned (e.g., by sawing) into tube sections and welding yokes of a driveshaft assembly to opposite ends of each tube section. Depending on the design of the driveshaft assembly, it may be desirable to subject one or both ends of the tube to an end reducing operation to achieve a desirable outer diameter at the end of the tube.

DETAILED DESCRIPTION OF THE INVENTION

The invention provides an economical process which produces light weight extruded aluminum tubes which can be used in driveshaft assemblies. In particular, the invention provides an aluminum alloy having a uniform fine grain structure which allows such extruded tube to be drawn without the need for an expensive separate furnace heat treatment. The alloy also allows the load requirements for extrusion to be reduced and thus increase the extrusion press productivity. The alloy further provides increased strength in the heat affected zone adjacent to the weld in the driveshaft assemblies while maintaining sufficient mechanical strength and torsional fatigue resistance.

According to the invention, an improved extrusion alloy is provided by formulating the alloy with an absence of recrystallization retarding elements. The absence of recrystalliztation retarding elements allows recrystallization during the extrusion process to a uniform fine grain structure. This uniform grain structure allows production into formable drawn tubing without the need for an expensive separate batch furnace heat treatment. Moreover, the elimination of the recrystallization retarding elements advantageously reduces the load requirements for extrusion, resulting in higher extrusion press productivity.

The alloy of the invention contains magnesium (Mg), silicon (Si), and copper (Cu) in amounts sufficient to produce high mechanical properties after extrusion, press quenching, cold drawing, and artificial aging. The Mg, Si and Cu contents can also be adjusted to provide increased strength in the heat affected zone adjacent welds of extruded tubes manufactured into driveshaft assemblies. The high mechanical strength and uniform grain structure allow welded driveshaft assemblies produced according to the invention to exhibit torsional fatigue resistance higher than competitive 6061-T6 products.

The alloy according to the invention can include, in weight %, 0.50 to 0.70% Si, up to 0.30% Fe, 0.20 to 0.40% Cu, up to 0.03% Mn, 0.80 to 1.10% Mg, up to 0.03% Cr, balance Al and impurities. An especially preferred alloy contains at least 96% Al, 0.55 to 0.65% Si, 0.20 to 0.30% Cu, 0.85 to 1.0% Mg, up to 0.05% Zn, and up to 0.03% Ti.

In the alloy of the invention, silicon improves strength by a precipitation strengthening effect. That is, silicon forms a $Mg_2Si$ compound with Mg in the alloy. The stoichiometric amount of Si necessary to react all of the Mg and form the $Mg_2Si$ compound can be determined by dividing the Mg content by 1.73. The $Mg_2Si$ compound can be precipitated in stages. For instance, because the ingots are homogenized by soaking at an elevated temperature (e.g., at least 6 hours above 1000° F.) and cut billets are subjected to solution reheating prior to extrusion, it is possible to control the state of the soluble second phase particles of $Mg_2Si$ in the dissolved state until extrusion has been completed. Later, some of the $Mg_2Si$ can be precipitated during natural aging and the remainder of the $Mg_2Si$ can be precipitated during a precipitation hardening heat treatment. The precipitated $Mg_2Si$ increases the static strength of the alloy. Compared to alloy 6063 which typically has an Mg content of 0.39–0.55% and a silicon content of 0.35–0.46%, the alloy of the invention preferably includes higher Mg and Si contents. In fact, the Mg and Si contents are analogous to those of alloy 6061 which typically includes 0.70 to 1.10% Mg and 0.60 to 0.70% Si. However, unlike alloy 6061 which typically includes 0.12 to 0.20% Cr, the alloy according to the invention is preferably free of recrystallization retarding elements such as Cr, Mn and Fe.

Copper solution-strengthens the matrix phase of the alloy and facilitates precipitation strengthening by the $Mg_2Si$ precipitate phase. That is, the copper improves the aging response of the alloy. According to the invention, the Cu is present in an amount of 0.20 to 0.40%, preferably 0.20 to 0.30%. Copper contents below 0.20 provide an insufficient strengthening effect whereas excessive Cu contents can degrade etrudability of the alloy.

According to the invention, it is highly desirable to minimize recrystallization retarding elements such as Cr, Mn and Fe. However, Fe is a typical impurity in aluminum and is typically found in amounts of 0.15 to 0.25% Fe except in high purity aluminum wherein the maximum content is limited to 0.06%. In the present invention, Fe is not intentionally added but can be present within commercial purity limits. In contrast, Mn and Cr are not typical impurities in aluminum and thus it is possible to maintain the Mn and Cr contents at low levels by intentionally excluding such elements from the alloy. For instance, the alloy can include up to 0.03% Mn and up to 0.03% Cr. In contrast, alloy 6061 includes an intentional Cr addition. Such recrystallization retarding elements are undesirable in the alloy according to the invention since they inhibit strain induced recrystallization during extrusion and cause extremely coarse and non-uniform grains to be formed. Such a non-uniform grain structure can lead to problems such as wrinkles during drawing if the grain size is too large. By eliminating recrystallization retarding elements, it is possible to achieve a uniform and fine grain structure throughout the extruded tube wall diameter and along the length thereof. The uniform fine grain structure achieved by the alloy according to the invention during extrusion leads to improved alloy properties as a result of the drawing and precipitation hardening treatments.

Zinc dissolves into the matrix of the alloy to form a solid-solution. However, in order to avoid loss of ductility of the alloy, the Zn content is preferably 0.20% or below, more preferably 0.05% or below.

The alloy can include a small amount of Ti in order to refine the as-cast structure. That is, Ti can be used to prevent solidification cracks since Ti is an effective grain refiner during liquid-solid phase transformations. Unlike Mn, Cr and Fe which are recrystallization retarding elements in solid phase transformations, Ti is not effective in retarding recrystallization in solid-solid phase transformations. According to the invention, Ti can be added to the alloy prior to casting by feeding a TiB$_2$ master alloy rod into the melt just before casting. Accordingly, the alloy may contain up to 0.05% Ti. A more preferred Ti content is up to 0.03%.

EXAMPLE

The alloy set forth in Table 1 was semi-continuously direct chill cast, homogenized, hot extruded by die and mandrel method, press quenched (solutionized by water cooling from extrusion temperature of 950–1050° F.), naturally aged, pointed, cold drawn (40–50% total reduction in area in two drawing steps to reduce OD and wall thickness), roll straightened, end reduced, solvent cleaned, artificially aged, rough cut, and machined to tolerances.

TABLE 1

Alloying Elements in Weight %

| Al | Si | Fe | Cu | Mn | Mg | Cr | Zn | Ti | Others each | Others Total |
|---|---|---|---|---|---|---|---|---|---|---|
| ≧96 | 0.55–0.65 | ≦0.30 | 0.20–0.30 | ≦0.03 | 0.85–1.00 | ≦0.03 | ≦0.05 | 0.005–0.03 | ≦0.05 | ≦0.15% |

In order to make a driveshaft assembly, the machined tube sections can have a cardboard dampener inserted therein and yokes metal inert gas (MIG) welded to opposite ends thereof. Desirable properties of the assembly include suitable rotational balance of the assembly, static torsional strength of the assembly, critical speed of the assembly, and fatigue resistance in torsional loading of the assembly. Specialized test equipment can be used to evaluate such properties. In rotary fatigue testing, the alloy according to the invention achieved a Weibull B10 life over twice that of competitive 6061-T6 products.

Advantages of the alloy according to the invention include elevated fatigue performance, a more uniform structure, increased forming capability, higher HAZ strength, and lower cost of production due to the lower extrusion pressure which allows increased productivity and the elimination of a costly additional step (i.e. furnace solution heat treatment). Test results for extruded 4.777 inch OD by 0.177 inch wall thickness drawn to 4.500 inch OD by 0.087 are set forth in Table 2. In obtaining samples, 10 billets of the alloy according to the invention were extruded and water quenched (WQ) or air quenched (AQ). A pressure chart generated during extrusion exhibited a noticeable reduction in breakout pressure and time for the alloy according to the invention versus standard 6061 billet. The tubes were cold drawn and straightened by a roll straightener. No hardness variation was observed around the circumference for any of the water quenched tubes evaluated.

Table 3 sets forth mechanical properties for samples from four tubes evaluated at the front, middle and back of the extruded length in T1 temper and after drawing and aging these same tubes were evaluated at the front and back in T8 temper. Table 3 sets forth test results for ultimate tensile strength (UTS), yield strength (YS) and elongation (El) strength after extrusion (T1) and final strength (T8). As shown in Table 3, all T8 samples according to the invention exhibited strength well in excess of 45.0 ksi UTS, 40.0 ksi YS and 5.0% elongation. Grain sizes were evaluated along the length of normal 6061, air quenched KSD4 and water quenched KDS4 after extrusion.

TABLE 2

Grain Size ASTM E112

| Location along tube | Location in tube wall | 6061 WQ | KDS4 WQ | KDS4 AQ | 6063 |
|---|---|---|---|---|---|
| Front | outer | 1 | 2 | 3–4 | 1+ |
| Front | center | 2–3 | 3–4 | 4–5 | 2–3 |
| Front | inner | 2–3 | 3 | 3–4 | 2–3 |
| Middle | outer | 1 | 2–3 | 2–3 | 1+ |
| Middle | center | 1–2 | 4–5 | 5–6 | 2 |
| Middle | inner | 2–3 | 3–4 | 3–4 | 2–3 |

TABLE 2-continued

Grain Size ASTM E112

| Location along tube | Location in tube wall | 6061 WQ | KDS4 WQ | KDS4 AQ | 6063 |
|---|---|---|---|---|---|
| Backend | outer | 1 | 1–2 | 1–2 | 1+ |
| Backend | center | 2–3 | 3–4 | 4.5–5.5 | 2–3 |
| Backend | inner | 1–2 | 2–3 | 3–4 | 3 |

TABLE 3

KDS4 Driveshaft Tubing - Strength After Extrusion (T1) and Final Strength (T8)

| Sample | T1 UTS | T1 YS | T1 % EL | T8 UTS | T8 YS | T8 % EL |
|---|---|---|---|---|---|---|
| Water Quenched Extrusions | | | | | | |
| 3F | 34.3 | 20.9 | 26.7 | 57.2 | 51.2 | 12.0 |
| 3M | 36.3 | 21.6 | 27.2 | | | |
| 3B | 35.9 | 21.2 | 27.1 | 59.3 | 53.7 | 11.0 |
| 6F | 35.6 | 22.2 | 26.8 | 54.6 | 49.4 | 10.0 |
| 6M | 36.5 | 22.6 | 23.8 | | | |
| 6B | 35.7 | 22.0 | 27.1 | 59.8 | 54.2 | 11.0 |
| 7F | 34.4 | 19.8 | 26.6 | 58.4 | 52.6 | 12.0 |
| 7M | 35.8 | 20.9 | 27.8 | | | |
| 7B | 35.3 | 21.1 | 25.5 | 59.7 | 53.9 | 11.0 |
| 8F | 35.2 | 20.1 | 24.9 | 57.6 | 51.8 | 12.0 |
| 8M | 35.3 | 21.0 | 27.9 | | | |
| 8B | 33.1 | 19.6 | 27.0 | 58.5 | 52.9 | 11.0 |
| Air Quenched Extrusions | | | | | | |
| 13F | 28.9 | 16.1 | 27.0 | 53.8 | 48.5 | 11.0 |
| 13M | 29.8 | 16.4 | 25.6 | | | |
| 13B | 30.0 | 16.7 | 26.0 | 54.4 | 49.3 | 11.0 |
| 15F | 32.8 | 19.1 | 24.6 | 53.1 | 48.1 | 11.0 |
| 15M | 31.3 | 18.3 | 25.4 | | | |
| 15B | 31.0 | 18.4 | 25.8 | 54.9 | 49.8 | 10.0 |
| 17F | 30.0 | 17.3 | 26.9 | 54.5 | 49.3 | 11.0 |

TABLE 3-continued

KDS4 Driveshaft Tubing - Strength After
Extrusion (T1) and Final Strength (T8)

| Sample | T1 UTS | T1 YS | T1 % EL | T8 UTS | T8 YS | T8 % EL |
|---|---|---|---|---|---|---|
| 17M | 30.1 | 17.0 | 25.7 | | | |
| 17B | 30.8 | 17.6 | 25.7 | 56.7 | 51.4 | 11.0 |
| 19F | 30.9 | 18.2 | 27.0 | 53.9 | 48.6 | 11.0 |
| 19M | 31.1 | 18.2 | 26.8 | | | |
| 19B | 31.8 | 18.8 | 25.2 | 57.0 | 51.3 | 12.0 |

Torsional fatigue life for 4 inch aluminum tubing produced according to the invention is set forth in Table 4. As shown, in the tests of six aluminum driveshafts, the weld yoke ear fractured after about 181,000 cycles. The B-10 life for 4 inch aluminum driveshafts is 167,329 cycles.

TABLE 4

Torsional Fatigue Life

| Sample | Cycles | Comment |
|---|---|---|
| 1 | 181,292 | weld yoke ear fractured |
| 2 | 255,637 | weld yoke ear fractured |
| 3 | 191,149 | weld yoke ear fractured |
| 4 | 183,175 | weld yoke ear fractured |
| 5 | 244,414 | weld yoke ear fractured |
| 6 | 215,529 | weld yoke ear fractured |

Table 5 sets forth longitudinal tensile test results carried out in accordance with ASTM B557 for drawn seamless tube in accordance with the invention. The billet used to make the samples included 0.59% Si, 0.23% Fe, 0.23% Cu, ≦0.01% Mn, 0.95% Mg, 0.02% Cr, 0.01% Zn, 0.01% Ti, balance Al. The alloy was in the T8 alloy-temper.

TABLE 5

| Sample | YS (ksi) | UTS (ksi) | Elongation (%) |
|---|---|---|---|
| 1 | 50.1 | 54.3 | 11.0 |
| 2 | 50.3 | 54.7 | 12.0 |
| 3 | 50.9 | 55.3 | 11.0 |
| 4 | 50.9 | 55.2 | 11.0 |
| 5 | 50.6 | 54.9 | 11.0 |
| 6 | 50.6 | 55.1 | 12.0 |
| 7 | 50.9 | 55.1 | 10.0 |
| 8 | 49.8 | 54.7 | 12.0 |
| 9 | 49.5 | 54.0 | 12.0 |

Three lots of drawn seamless tube produced according to the invention were evaluated compared to alloy 6063. The alloy according to the invention was evaluated using two ID's and wall thicknesses (KDS4-A corresponding to 3.839 inch ID and 0.083 inch wall thickness and KDS4-B corresponding to 4.874 inch ID and 0.075 inch wall thickness). The 6063 alloy is identified by 6063-B which had the same dimensions as KDS4-B. All samples were provided in the T8 temper. As shown in Table 6, the alloy according to the invention (KDS4) exhibited comparable elongation to alloy 6063 but had much better yield strength and ultimate tensile strength properties.

TABLE 6

| Sample | YS (ksi) | UTS (ksi) | Elong (%) |
|---|---|---|---|
| KDS4-A | 48.5–51.5 | 52.7–55.9 | 9.6–11.0 |
| KDS4-B | 51.0–53.0 | 54.9–57.0 | 10.0–11.8 |

TABLE 6-continued

| Sample | YS (ksi) | UTS (ksi) | Elong (%) |
|---|---|---|---|
| 6063-B | 39.4–41.5 | 42.5–44.7 | 10.6–11.8 |

The foregoing data demonstrates that the alloy according to the invention achieves high strength, high formability and high fatigue properties. Compared to conventional 6063 alloys, the alloy according to the invention provides much higher strengths while achieving similar forming properties. Compared to conventional alloy 6061, the alloy of the invention exhibits better formability while achieving similar strengths. Compared to alloys processed in a T6 temper, the alloy of the invention can achieve similar mechanical properties by a much more economical process since the alloy according to the invention can be quenched as it exits from the extruder die whereas the T6 treatment requires a solution batch treatment to be performed after cold drawing the extruded tube. However, unlike alloy 6061 which exhibits insufficient fatigue life to meet the demanding requirements of a drive shaft, the alloy according to the invention exhibits significantly improved fatigue strength well in excess of minimum product requirements.

The foregoing has described the principles, preferred embodiments and modes of operation of the present invention. However, the invention should not be construed as being limited to the particular embodiments discussed. Thus, the above-described embodiments should be regarded as illustrative rather than restrictive, and it should be appreciated that variations may be made in those embodiments by workers skilled in the art without departing from the scope of the present invention as defined by the following claims.

What is claimed is:

1. An aluminum-based alloy useful for driveshaft assemblies, the alloy consisting essentially of, in weight %, 0.50 to 0.70% Si, up to 0.30% Fe, 0.23 to 0.40% Cu, up to 0.02% Mn, 0.80 to 1.10% Mg, up to 0.03% Cr, balance Al and impurities.

2. The alloy of claim 1, wherein the Si content is 0.55 to 0.65% and the Mg content is 0.85 to 1.0%.

3. The alloy of claim 1, wherein the alloy may include up to 0.20% Zn and up to 0.05% Ti.

4. The alloy of claim 1, wherein the alloy does not include any intentionally added elements which retard recrystallization during solid phase transformations.

5. The alloy of claim 1, consisting essentially of at least 96% Al, 0.55 to 0.65% Si, 0.23 to 0.30% Cu, 0.85 to 1.0% Mg, up to 0.05% Zn, and up to 0.03% Ti.

6. The alloy of claim 1, wherein the alloy comprises a tube of a driveshaft assembly, the tube having a yoke welded to each end thereof.

7. The alloy of claim 1, wherein the alloy comprises a drawn and precipitation hardened extruded tube.

8. The alloy of claim 1, in a T8 temper having a yield strength of at least 40 ksi, an ultimate tensile strength of at least 45 ksi and elongation of at least 5%.

9. The alloy of claim 1, in a T8 temper having a yield strength of at least 45 ksi, an ultimate tensile strength of at least 50 ksi and elongation of at least 10%.

10. The alloy of claim 1, wherein the Fe content is no greater than 0.06%.

11. The alloy of claim 1, wherein the Mn content is no greater than 0.01%.

12. The alloy of claim 11, wherein the Fe content is no greater than 0.06%.

* * * * *